(12) United States Patent
Ide et al.

(10) Patent No.: US 6,556,845 B1
(45) Date of Patent: Apr. 29, 2003

(54) BASE STATION DEVICE AND TRANSMISSION METHOD

(75) Inventors: Minako Ide, Yokohama (JP); Katsuhiko Hiramatsu, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/530,914

(22) PCT Filed: Sep. 13, 1999

(86) PCT No.: PCT/JP99/04964

§ 371 (c)(1),
(2), (4) Date: May 8, 2000

(87) PCT Pub. No.: WO00/18022

PCT Pub. Date: Mar. 30, 2000

(30) Foreign Application Priority Data

Sep. 18, 1998 (JP) .......................................... 10-264349

(51) Int. Cl.[7] ................................................ H04B 7/26
(52) U.S. Cl. ................ 455/562; 455/277.1; 455/277.2; 375/347
(58) Field of Search .................. 455/277.1, 277.2, 455/278.1, 279.1, 562; 342/457, 383

(56) References Cited

U.S. PATENT DOCUMENTS

| 4,316,192 A | * | 2/1982 | Acoraci ..................... 343/100 |
| 5,218,359 A | * | 6/1993 | Minamisono ............... 342/383 |
| 5,781,845 A | * | 7/1998 | Dybdal et al. ................ 455/65 |
| 6,141,335 A | * | 10/2000 | Kuwahara .................... 370/342 |
| 6,252,548 B1 | * | 6/2001 | Jeon ........................... 342/383 |
| 6,369,758 B1 | * | 4/2002 | Zhang ......................... 342/383 |

FOREIGN PATENT DOCUMENTS

| EP | 0595247 A1 | | 4/1994 | |
| JP | 1202036 | | 8/1989 | |
| JP | 5206918 | | 8/1993 | |
| JP | 09235633 | * | 1/1997 | ............ H04B/7/26 |
| JP | 9074375 | | 3/1997 | |
| JP | 10098422 | | 4/1998 | |
| JP | 10173585 | | 6/1998 | |
| JP | 10313472 | | 11/1998 | |
| JP | 11074831 | | 3/1999 | |

OTHER PUBLICATIONS

Korean Office Action dated Mar. 29, 2002.
English translation of Korean Office Action.
PCT International Search Report dated Nov. 2, 1999.

* cited by examiner

Primary Examiner—Thanh Cong Le
Assistant Examiner—James D Ewart
(74) Attorney, Agent, or Firm—Stevens, Davis, Miller & Mosher, LLP

(57) ABSTRACT

A multiplication circuit 152 multiplies signals, which are subjected to variable directional transmission, by weighting factors with respect to the respective antennas 101 to 103, and outputs the resultant to combining circuits 155 to 157, respectively. The signals input to the combining circuit 155 are combined and radio modulated by a radio section 104, and transmitted from the antenna 101. Whereby, in a case where variable directional transmission is performed with respect to only some terminal apparatuses, signals, which are subjected to no variable directional transmission, can be transmitted after spreading them from the respective antennas of an array antenna.

15 Claims, 3 Drawing Sheets

BASE STATION DEVICE AND TRANSMISSION METHOD

TECHNICAL FIELD

The present invention relates to a base station apparatus for use in a digital radio communication system that performs directional transmission by an adaptive array antenna in a forward link, and relates to a transmitting method.

BACKGROUND ART

The digital radio communication system such as a cellular phone, a car phone, and the like uses a cellular system in which a communication area is divided into cells, one base station apparatus is placed at each cell, and a plurality of terminal apparatuses performs broadcast communication with this base station apparatus. In recent years, since the cellular systems have spread rapidly and the number of system users has rapidly increased, improvement of increasing a channel capacity in one cell has become an important subject.

As a technique for increasing the channel capacity, an adaptive array antenna is described in "Waveform Equalizing Technology for Digital Mobile Communications (supervised by Jun Horikoshi, Triceps). This is the technique in which the adaptive array antenna adds amplitude and phase shift to the antenna outputs of the array antenna composed of a plurality of antennas and combines them to form the directivity of array, whereby the adaptive array antenna determines a weighting factor of each antenna output based on a predetermined control algorithm, and controls the directivity as adapting to a change in an environmental state.

As a technique for improving in an increase of channel capacity, there is an adaptive array antenna described in such as "Waveform Equalizing Technology for Digital Mobile Communications (supervised by Jun Horikoshi, Triceps). This is the technique in which the adaptive array antenna adds amplitude and phase shift to the antenna outputs of the array antenna composed of a plurality of antennas and combines them to form the directivity of array, whereby the adaptive array antenna determines a weighting factor of each antenna output based on a predetermined control algorithm, and controls the directivity as adapting to a change in an environmental state.

Then, the adaptive array antenna is mounted on the base station apparatus and interference from the other cell is canceled to improve a reception quality, and this makes it possible to improve an increase in the channel capacity of a reverse link.

In addition, the base station apparatus on which the adaptive array antenna is mounted estimates an arrival direction of a signal transmitted from the terminal apparatus, and performs directional transmission in the estimated direction, so that transmission power from the base station apparatus can be lessened as maintaining a link quality. This makes it possible to reduce interference with the other terminal apparatus and to improve the increase in the channel capacity of the forward link.

However, the base station apparatus estimates the signal arrival direction with respect to all terminal apparatuses with which the base station apparatus performs communications in the forward link, and carries out directional transmission, and this increases an amount of signal processing so as to cause a problem in which the apparatus size increases.

In order to solve such a problem, the convenional base station apparatus performs directional transmission with respect to some of the terminal apparatuses such as the terminal apparatus, which performs high-speed data transmission, or the terminal apparatus, which needs large transmission power by use of the array antenna. Then, the conventional base station apparatus performs transmission having no directivity such as sector transmission, omnidirectional transmission (hereinafter referred to as "nondirectional transmission") with respect to the other terminal apparatuses by use of an antenna prepared separately from the array antenna or one of antennas included in the array antenna.

This improves the increase in the channel capacity without increasing the apparatus size of a signal processing section so much.

However, since the aforementioned conventional base station apparatus combines a plurality of signals subjected to nondirecitonal transmission and transmits the combined signal from one antenna, transmission power in this antenna is not reduced. This causes a problem in which a dynamic range at an amplifying operation time of a radio section cannot be suppressed, so that a large-sized and large-valued amplification must be used.

DISCLOSURE OF INVENTION

It is an object of the present invention is to provide a base station apparatus, which can suppress necessary power for an amplifier and which can miniaturize the size of the apparatus in performing directional transmission with respect to only some of terminal apparatuses, and to provide the transmission method.

This object can be achieved by dividing signals subjected to directional transmission into signal components whose number is the same as that of antenna elements of an array antenna, respectively, assigning weights to the respective signal components of the divided signals subjected to directional transmission, allocating a signal subjected to no variable directional transmission to any one of the antenna elements, and combining signals transmitted from the same antenna element so as to perform radio transmission.

DETAILED DESCRIPTION OF THE INVENTION

Figure 1:
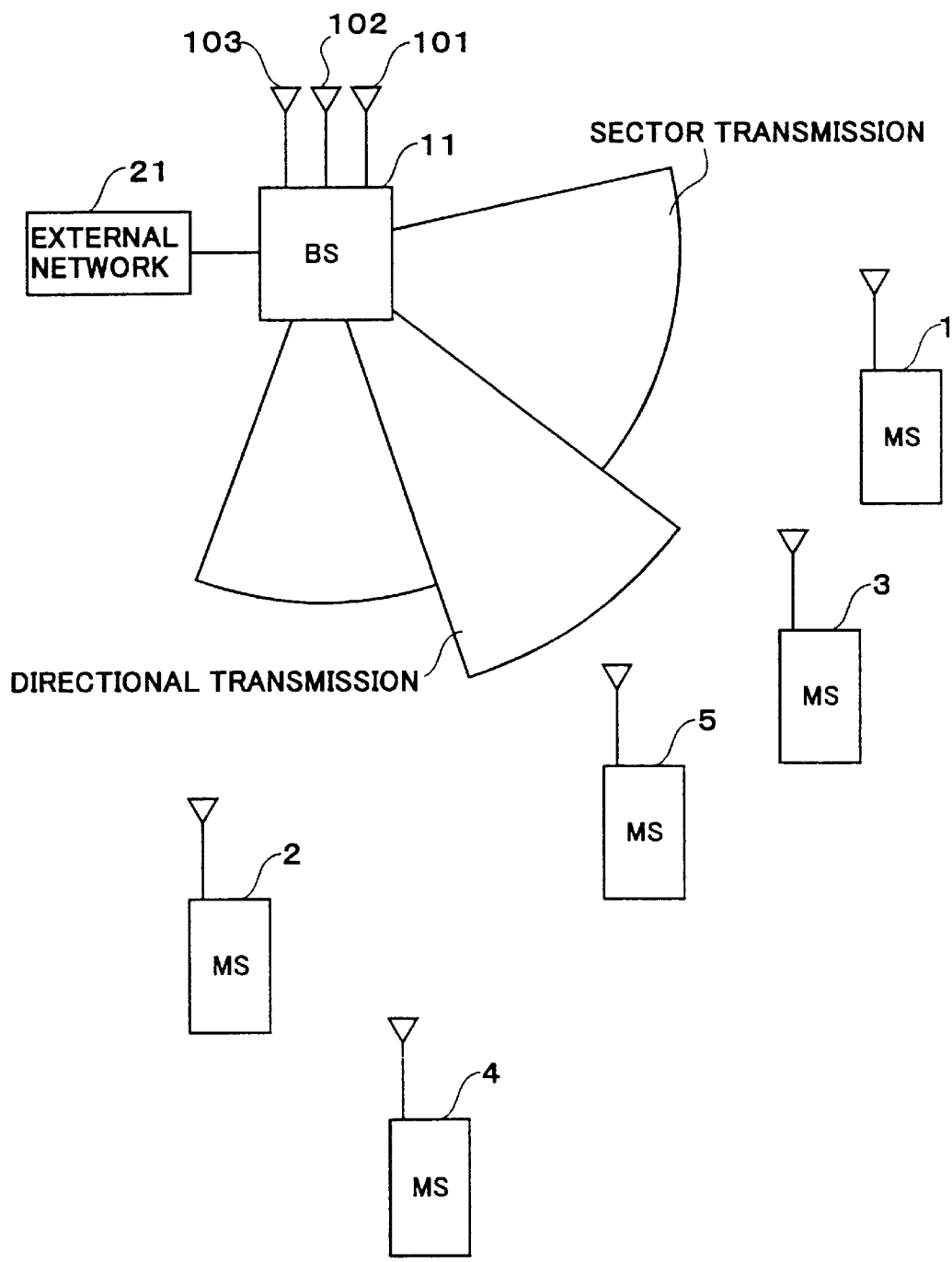
FIG. 1 is a system view of a radio communication system including a base station apparatus of the present invention.

The following will specifically explain the best mode for carrying out the present invention with reference to the drawings accompanying herewith. FIG. 1 is a system view of a radio communication system including a base station apparatus of the present invention.

A base station apparatus 11 of FIG. 1 serves as a repeater for communications, processes signals radio transmitted from terminal apparatuses to radio or cable transmit the processed signals to an external network 21, and processes signals radio or cable transmitted from the external network 21 and radio transmit the processed signals to the respective terminal apparatuses.

Here, it is assumed that the base station apparatus 11 of FIG. 1 has three antennas 101, 102, and 103, performs broadcast communication with five terminal apparatuses. Then, it is assumed that the base station apparatus 11 performs nondirectional transmission with respect to terminal apparatuses 1, 2, 3, and 4, and directional transmission with respect to terminal apparatus 5.

(First Embodiment)

Figure 2:
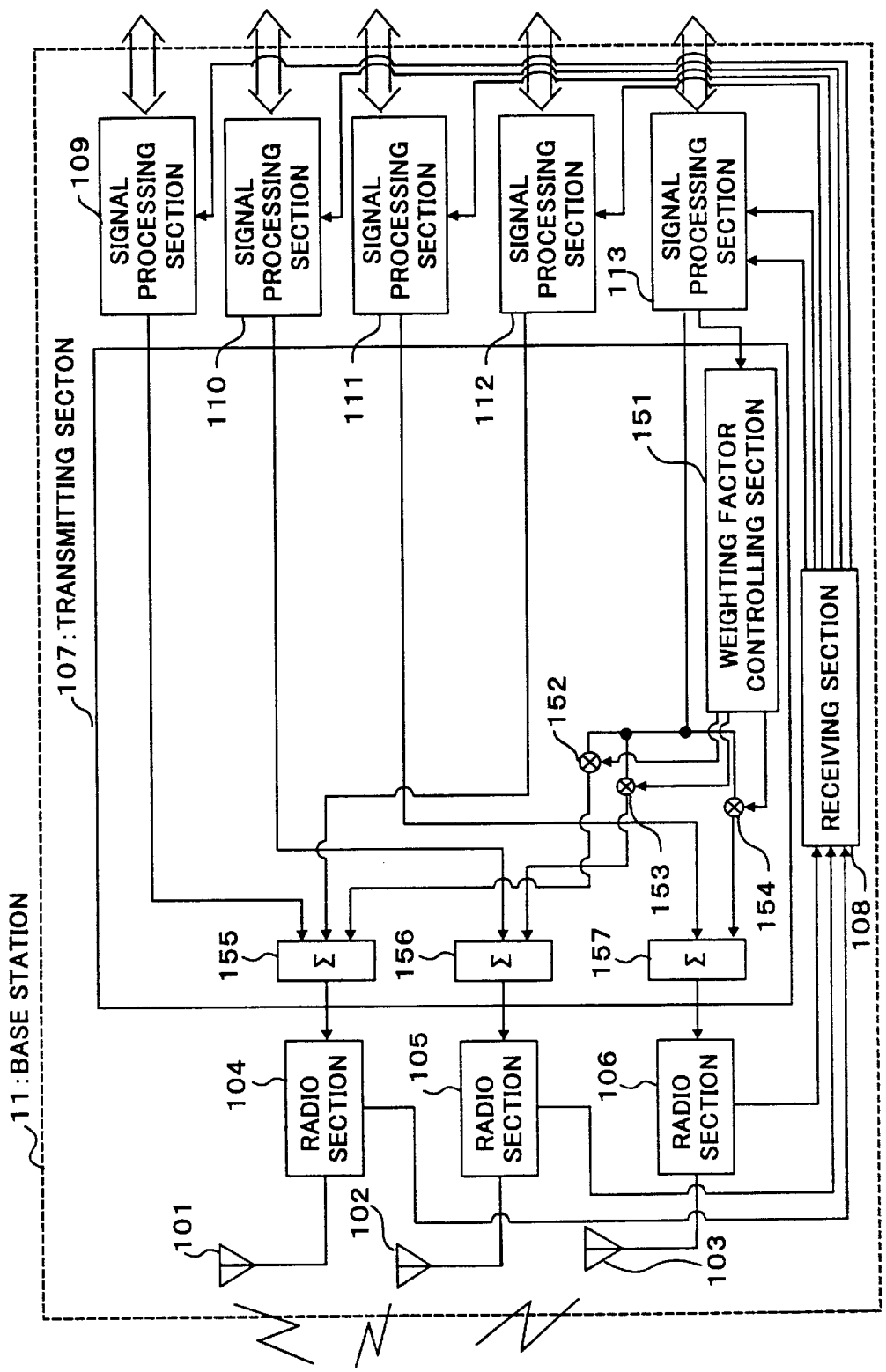
FIG. 2 is a block diagram showing a configuration of the base station apparatus according to a first embodiment of the present invention.

FIG. 2 is a block diagram showing a configuration of the base station apparatus according to a first embodiment of the present invention.

The base station apparatus 11 of FIG. 2 comprises three antennas 101, 102, 103, radio sections 104, 105, 106, a transmitting section 107, receiving section 108, and signal processing sections 109, 110, 111, 112, 113. The transmitting section 107 includes a weighting factor controlling section 151, multiplication circuits 152, 153, 154, and combining circuits 155, 156, 157.

The radio section 104 converts a high-frequency signal received by the antenna 101 to a baseband signal and outputs it to the receiving section 108. The radio section 104 also converts a baseband signal input from the combining circuit 155 to a high-frequency signal, and radio transmits it from the antenna 101. The radio section 105 converts a high-frequency signal received by the antenna 102 to a baseband signal, and outputs it to the receiving section 108. The radio section 105 also converts a baseband signal input from the combining signal 156 to a high-frequency signal, and radio transmits it from the antenna 102. The radio section 106 converts a high-frequency signal received by the antenna 103 to a baseband signal and outputs it to the receiving section 108. The radio section 106 also converts a baseband signal input from the combining circuit 157 to a high-frequency signal, and radio transmits it from the antenna 103.

The transmitting section 107 spreads transmission signals input from the respective signal processing sections with respect to the respective terminal apparatuses, combines them, and outputs it to each radio section. The receiving section 108 demodulates baseband signals from the respective radio sections, fetches signals received from the respective terminal apparatuses, combines them, and outputs it to the respective signal processing sections. Moreover, the receiving section 108 estimates an arrival direction of a received signal (hereinafter referred to as "fifth received signal") subjected to directional reception from the terminal apparatus 5, and outputs information of the arrival direction to the signal processing section 113.

The signal processing section 109 decodes a received signal (hereinafter referred to as "first received signal"), which has been sent from the terminal apparatus 1 and input from the receiving section 108. Then, the signal processing section 109 outputs the decoded signal to an external network. Moreover, the signal processing section 109 codes a transmission signal (hereinafter referred to as nfirst transmission signal") with respect to the terminal apparatus 1, which has been input from the external network, modulates the coded signal, and outputs it to the combining circuit 155.

The signal processing section 110 decodes a received signal (hereinafter referred to as "second received signal"), which has been sent from the terminal apparatus 2 and which input from the receiving section 108. Then, the signal processing section 110 outputs the decoded signal to an external network. Moreover, the signal processing section 110 codes a transmission signal (hereinafter referred to as "second transmission signal") with respect to the terminal apparatus 2, which has been input from the external network, modulates the coded signal, and outputs it to the combining circuit 156.

The signal processing section 111 decodes a received signal (hereinafter referred to as "third received signal"), which has been sent from the terminal apparatus 3 and which input from the receiving section 108. Then, the signal processing section 111 outputs the decoded signal to an external network. Moreover, the signal processing section 111 codes a transmission signal (hereinafter referred to as "third transmission signal") with respect to the terminal apparatus 3, which has been input from the external network, modulates the coded signal, and outputs it to the combining circuit 157.

The signal processing section 112 decodes a received signal (hereinafter referred to as "fourth received signal"), which has been sent from the terminal apparatus 4 and which input from the receiving section 108. Then, the signal processing section 112 outputs the decoded signal to the external network. Moreover, the signal processing section 112 codes a transmission signal (hereinafter referred to as "fourth transmission signal") with respect to the terminal apparatus 4, which has been input from the external network, modulates the coded signal, and outputs it to the combining circuit 155.

The signal processing section 113 decodes a fifth received signal input from the receiving section 108, and outputs the decoded signal to the external network. Moreover, the signal processing section 113 codes a transmission signal with respect to the terminal apparatus 5 (hereinafter referred to as "fifth transmission signal"), which has been input from the external network, modulates the coded signal, and outputs it to the respective multiplication circuits in parallel. Furthermore, the signal processing section 113 outputs information of the arrival direction input from the receiving section 108 to the weighting factor controlling section 151.

The weighting factor controlling section 151 calculates a weighting factor of each antenna output based on information of the arrival direction input from the signal processing section 113, and outputs the calculated weighting factor to each multiplication circuit. The multiplication circuit 152 multiplies the fifth transmission signal by the weighting factor input from the weighting factor controlling section 151, and outputs it to the combining circuit 155. The multiplication circuit 153 multiplies the fifth transmission signal by the weighting factor input from the weighting factor controlling section 151, and outputs it to the combining circuit 156. The multiplication circuit 154 multiplies the fifth transmission signal by the weighting factor input from the weighting factor controlling section 151, and outputs it to the combining circuit 157.

The combining circuit 155 combines the signals input from the signal processing section 109, signal processing section 112, and multiplication circuit 152, and outputs it to the radio section 104. The combining circuit 156 combines the signals input from the signal processing section 110, and multiplication circuit 153, and outputs it to the radio section 105. The combining circuit 157 combines the signals input from the signal processing section 111, and multiplication circuit 154, and outputs it to the radio section 106.

The following will explain the flow of the received signals from the respective terminal apparatuses in the base station apparatus 11 of FIG. 2.

The signal received from the antenna 101 is converted to the baseband signal from the high-frequency signal by the radio section 104, and the converted signal is output to the receiving section 108. Similarly, the signal received from the antenna 102 is converted to the baseband signal from the high-frequency signal by the radio section 105, the signal received from the antenna 103 is converted to the baseband signal from the high-frequency signal by the radio section 106, and these converted signals are output to the receiving section 108, respectively.

Then, in the receiving section 108, the baseband signals from the respective radio sections are demodulated, the received signals are fetched from the respective terminal apparatuses, diversity combining, which includes adaptive array antenna processing, is performed, and the arrival direction of the fifth received signal, which has been directionally received, is estimated.

The first received signal is decoded by the signal processing section 109, and the decoded signal is transmitted to an external network system. Similarly, the second received signal is decoded by the signal processing section 110, the third received signal is decoded by the signal processing section 111, the fourth received signal is decoded by the signal processing section 112, the fifth received signal is decoded by the signal processing section 113, and these decoded signals are transmitted to the external network system, respectively.

Furthermore, information of the arrival direction estimated by the receiving section 108 is output to the weighting factor controlling section 151 via the signal processing section 113. Then, the weighting factor controlling section 151 calculates the weighting factor of the fifth transmission signal based on information of the arrival direction, and outputs the calculated weighting factor to the multiplication circuits 152, 153, 154, respectively.

Next, an explanation is given of the flow of the transmission signals to the respective terminal apparatuses in the base station apparatus 11 of FIG. 2.

The first transmission signal is coded, modulated, and output to the combining circuit 155 by the signal processing section 109. The second transmission signal is coded, modulated, and output to the combining circuit 156 by the signal processing section 110. The third transmission signal is coded, modulated, and output to the combining circuit 157 by the signal processing section 111. The fourth transmission signal is coded, modulated, and output to the combining circuit 155 by the signal processing section 112.

The fifth transmission signal is coded and modulated by the signal processing section 113. The modulated fifth transmission signal is multiplied by the weighting factor with respect to the antenna 101 by the multiplication circuit 152, and the resultant is output to the combining circuit 155. Similarly, the modulated fifth transmission signal is multiplied by the weighting factor with respect to the antenna 102 by the multiplication circuit 153, and the resultant is output to the combining circuit 157.

The signals input to the combining circuit 155 are combined, and radio modulated by the radio section 104, and transmitted through the antenna 101. The signals input to the combining circuit 156 are combined, and radio modulated by the radio section 105, and transmitted through the antenna 102. The signals input to the combining circuit 157 are combined, and radio modulated by the radio section 106, and transmitted through the antenna 103.

Thus, the signals other than those subjected to the directional transmission are transmitted in such a manner that they are spread to the respective antennas of the array antenna, so that transmission power of antennas can be spread. This eliminates the case in which an antenna whose transmission power is considerably large as compared with the other antenna, and makes it possible to miniaturize the size of the amplifier in the radio section.

Here, since the phase of the output of the amplifier differs in accordance with an amplification rate in general, a radio section calibration for adjusting this phase between the respective antennas is needed. According to this embodiment, since the width of the signal amplification rate can be suppressed to be small, a phase rotation width can be reduced at a signal amplifying time, and this is effective in simplifying the radio section calibration necessary for the adaptive array antenna.

(Second Embodiment)

Figure 3:
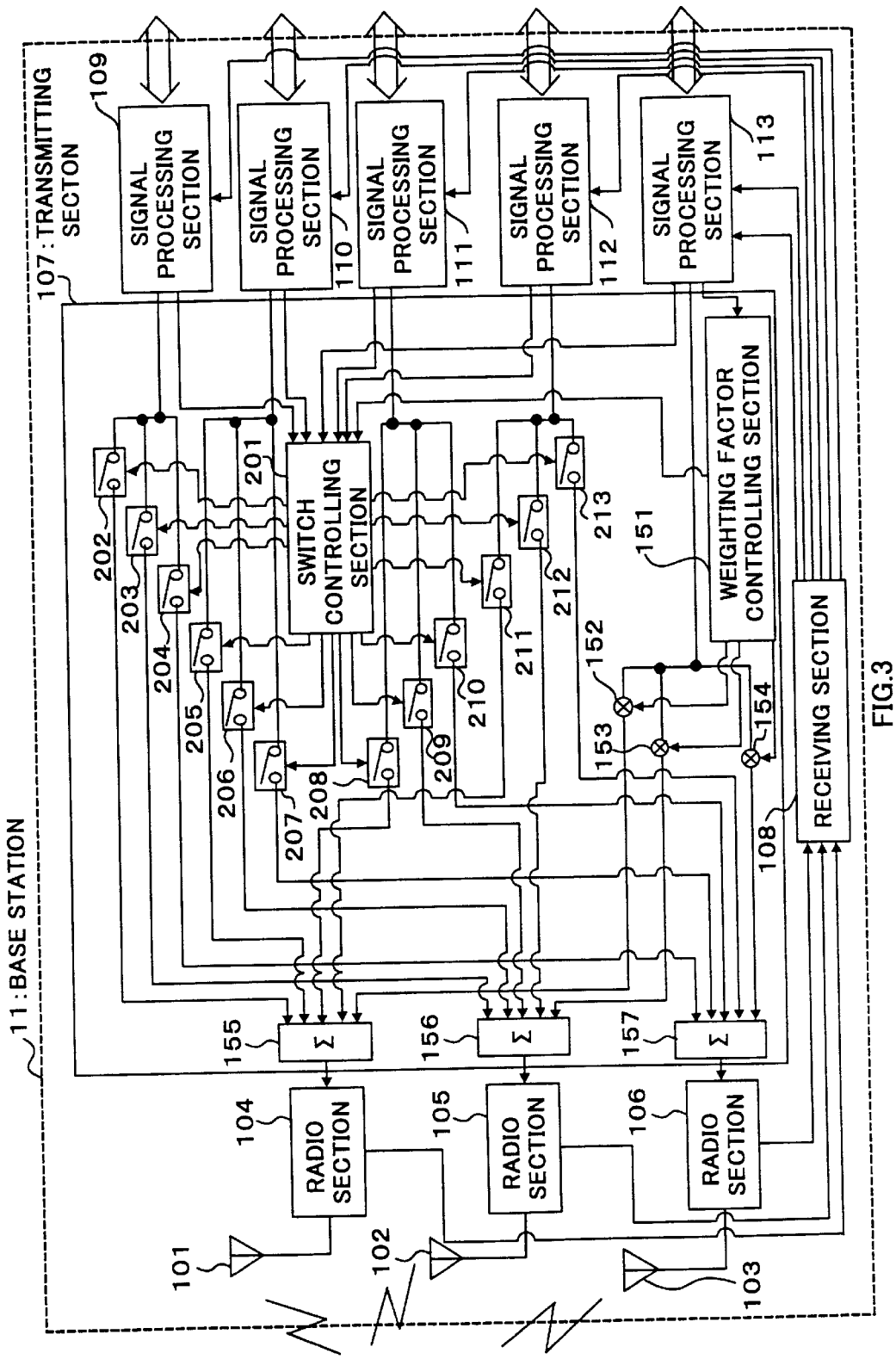
FIG. 3 is a block diagram showing a configuration of the base station apparatus according to a second embodiment.

FIG. 3 is a block diagram showing a configuration of the base station apparatus according to a second embodiment.

In the base station apparatus of FIG. 3, the same reference numerals as those of the base station apparatus of FIG. 2 are added to the portions common to the portions of FIG. 2.

The base station apparatus of FIG. 3 adopts the 5 configuration in which a switch control section 201 and connection switches 202 to 213 are added to the base station apparatus of FIG. 2.

The switch control section 201 controls the respective connection switches such that transmission power of the respective antennas is equalized to each other based on transmission power with respect to each terminal apparatus, which has been input from the respective signal processing sections and the weighting factor input from the weighting factor controlling section 151. The connection switches 202 to 213 are connected or disconnected by control of the switch controlling section 201.

The following will explain an example of the control of the switch controlling section 201 wherein transmission power to the terminal apparatus 1 is "1.0", transmission power to the terminal apparatus 2 is "1.5", transmission power to the terminal apparatus 3 is "1.8", transmission power to the terminal apparatus 4 is "2.2", transmission power to the terminal apparatus 5 is "2.0", weighting factor to be output to the multiplication circuit 152 is "0.5", weighting factor to be output to the multiplication circuit 153 is "0.3", and weighting factor to be output to the multiplication circuit 154 is "0.2".

First, the switch controlling section 201 multiplies transmission power of the directional transmission signal by the weighting factor, and calculates transmission power of each antenna of the directional transmission signal. In this example, transmission power to the terminal apparatus 5 of antenna 101 is "1.0", transmission power to the terminal apparatus 5 of antenna 102 is "0.6", and transmission power to the terminal apparatus 5 of antenna 103 is "0.4".

Next, antennas for transmitting nondirectinal transmission signals are allocated such that transmission power of the respective antennas is equalized to each other. In this example, the first transmission antenna is transmitted from the antenna 103, the second transmission antenna is transmitted from the antenna 103, the third transmission antenna is transmitted from the antenna 101, and the fourth transmission antenna is transmitted from the antenna 102. As a result, transmission power of antenna 101 becomes "2.8", transmission power of antenna 102 becomes "2.8", transmission power of antenna 103 becomes "2.9", and the difference between the respective antennas in transmission power becomes the smallest.

Finally, the switch controlling section 201 controls the respective switches based on the antenna allocation result. In this example, the switch controlling section 201 connects the connection switches 204, 207, 208, 212, and disconnects the other connection switches.

For reference sake, the switch controlling section 201 appropriately controls the connection switches in accordance with the change in transmission power to each terminal apparatus and each weighting factor.

Thus, the transmission signals with respect to the respective terminal apparatus are allocated to the respective antennas such that transmission power of the respective antennas achieves substantially the same level as each other. This makes it possible to further miniaturize the apparatus as compared with the first embodiment.

The second embodiment performed the selection of antenna for transmitting the signals other than those subjected to the directional transmission by changing the switch. However, this can be carried out by weighting factor control by use of the weighting factor controlling section and the multiplication circuit in place of the switch control section and the connection switches. In this case, the weighting factor controlling section sets one of the weighting factors to be output to "1" and the other to "0". The input of the weighting factor "1" to the multiplication circuit is equivalent to the connection of the connection switches, and the signal input to the multiplication circuit is directly output. The input of the weighting factor "0" to the multiplication circuit is equivalent to the disconnection of the connection switches, and nothing is output from the multiplication circuit.

This allows the respective signal processing sections to process both the nondirecitonal transmission signals and the direction transmission signals. More specifically, in the case of processing the directional transmission signal, each signal processing section outputs the weighting factor to the weighting factor controlling section based on information of the arrival direction, and in the case of processing the nondirectional transmission signal, each signal processing section outputs the weighting factor of "1" or "0" to the weighting factor controlling section.

The present invention can be applied to any system in which directional transmission and nondirectional transmission are mixed, and is not limited by such as a signal multiplex division system.

As explained above, according to the base station apparatus of the present invention and the transmitting method, since the nondirectional transmission signals can be allocated to the respective antennas of the array antenna, transmission power of the respective antenna can be spread. This eliminates the case in which an antenna whose transmission power is considerably large as compared with the other antennas, and makes it possible to miniaturize the size of the amplifier in the radio section. This means that a phase rotation width can be reduced at a signal amplifying time, and this is effective in simplifying the radio section calibration necessary for the adaptive array antenna.

This application is based on the Japanese Patent Application No. HEI10-264349 filed on Sep. 18, 1998, entire content of which is expressly incorporated by reference herein.

Industrial Applicability

The present invention is suitable for a digital radio communication system in which an adaptive array antenna is mounted on a base station apparatus and directional transmission is performed with respect to only some terminal apparatuses.

What is claimed is:

1. A base station apparatus comprising:
    an adaptive array antenna for forming directivity using a plurality of antenna elements
    a signal divider that divides first signals, which are subjected to variable directional transmission, into signal components whose number is the same as that of said antenna elements;
    a weighter that assigns weights to the respective signal components of said first signals;
    a signal allocator that allocates second signals, which are subjected to omni-directional transmission, to any one of said antenna elements;
    a signal combiner that combines said first and second signals transmitted from the same one of said antenna elements; and
    a radio transmitter that radio transmits the combined signal from each of said antenna elements.

2. The base station apparatus according to claim 1, wherein said allocating means spreads the allocating destinations of the respective second signals.

3. The base station apparatus according to claim 1, wherein said allocating means minimizes the difference between the respective antenna elements in the number of second signals to be allocated to the respective antenna elements.

4. The base station apparatus according to claim 1, wherein said allocating means minimizes the difference between the respective antenna elements in transmission power based on transmission power of the weighted first signal components and that of the weighted second signal components.

5. The base station apparatus according to claim 1, wherein connection switches are provided on the way of each path through which said second signals are sent to the antenna element, said allocating means connects said connection switch provided on the way of the antenna element of the allocating destination of the respective second signals, and disconnects the other switches.

6. The base station apparatus according to claim 1, wherein multipliers, which multiply input second signals by coefficients, are provided on the way of each path through which said second signals are sent to the antenna elements, said allocating means outputs a coefficient of "1" to the multiplier provided on the way of the antenna element of the allocating destination of the respective second signals, and outputs a coefficient of "0" to the other multipliers.

7. A terminal apparatus, which performs radio communications with the base station apparatus described in claim 1.

8. A transmitting method comprising the steps of:
    dividing first signals, which are subjected to adaptive directional transmission, into signal components whose number is the same as that of antenna elements of an adaptive array antenna;
    assigning weights to the respective signal components of said first signals;
    allocating second signals, which are subjected to omni-directional transmission, to any one of said antenna elements;
    combining said first and second signals transmitted from the same one of said antenna elements and radio transmitting the combined signal from each of said antenna elements.

9. The transmitting method according to claim 8, wherein said allocating step spreads the allocating destinations of the respective second signals.

10. The transmitting method according to claim 8, wherein said allocating step minimizes the difference between the respective antenna elements in the number of second signals to be allocated to the respective antenna elements.

11. The transmitting method according to claim 8, wherein said allocating step minimizes the difference between the respective antenna elements in transmission power based on transmission power of the weighted first signal components and that of the weighted second signal components.

12. The transmitting method according to claim 8, wherein connection switches are provided on the way of each path through which said second signals are sent to the antenna element, said allocating means connects said connection switch provided on the way of the antenna element of the allocating destination of the respective second signals, and disconnects the other switches.

13. The transmitting method according to claim 8, wherein multipliers, which multiply input second signals by coefficients, are provided on the way of each path through which said second signals are sent to the antenna elements, said allocating means outputs a coefficient of "1" to the multiplier provided on the way of the antenna element of the allocating destination of the respective second signals, and outputs a coefficient of "0" to the other multipliers.

14. A base station apparatus, comprising:

an adaptive array antenna that provides beam directivity using a plurality of antenna elements a signal decomposition unit that decomposes a first signal, which is subject to adaptive directional transmission, into signal components, each of the signal components corresponding to a distinct one of the antenna elements;

a weighting unit that assigns a weight to each of the respective signal components of the first signal;

a signal allocator that allocates a second signal, which is subject to non-adaptive directional transmission, to one of the antenna elements;

a combiner that combines the second signal and a designated one of the signal components of the first signal into a combined signal; and a transmitter that transmits the combined signal from the one of the antenna elements corresponding to the designated signal component and transmits each of the signal components, other than the designated signal component, from the corresponding one of the antenna elements.

15. A transmitting method, comprising:

dividing a first signal that is subject to adaptive directional transmission into signal components, each of the signal components corresponding to a distinct antenna element of an adaptive array antenna comprising a plurality of antenna elements;

assigning a weight to each of the respective signal components of the first signal;

allocating a second signal, which is subject to non-adaptive directional transmission, to one of the antenna elements combining the second signal and a designated one of the signal components of the first signal into a combined signal;

transmitting the combined signal from the one of the antenna elements corresponding to the designated signal component; and transmitting each of the signal components, other than the designated signal component, from the corresponding one of the antenna elements.

* * * * *